March 6, 1956  C. E. HEMMINGER  2,737,473
HYDROFORMING
Filed Feb. 2, 1951
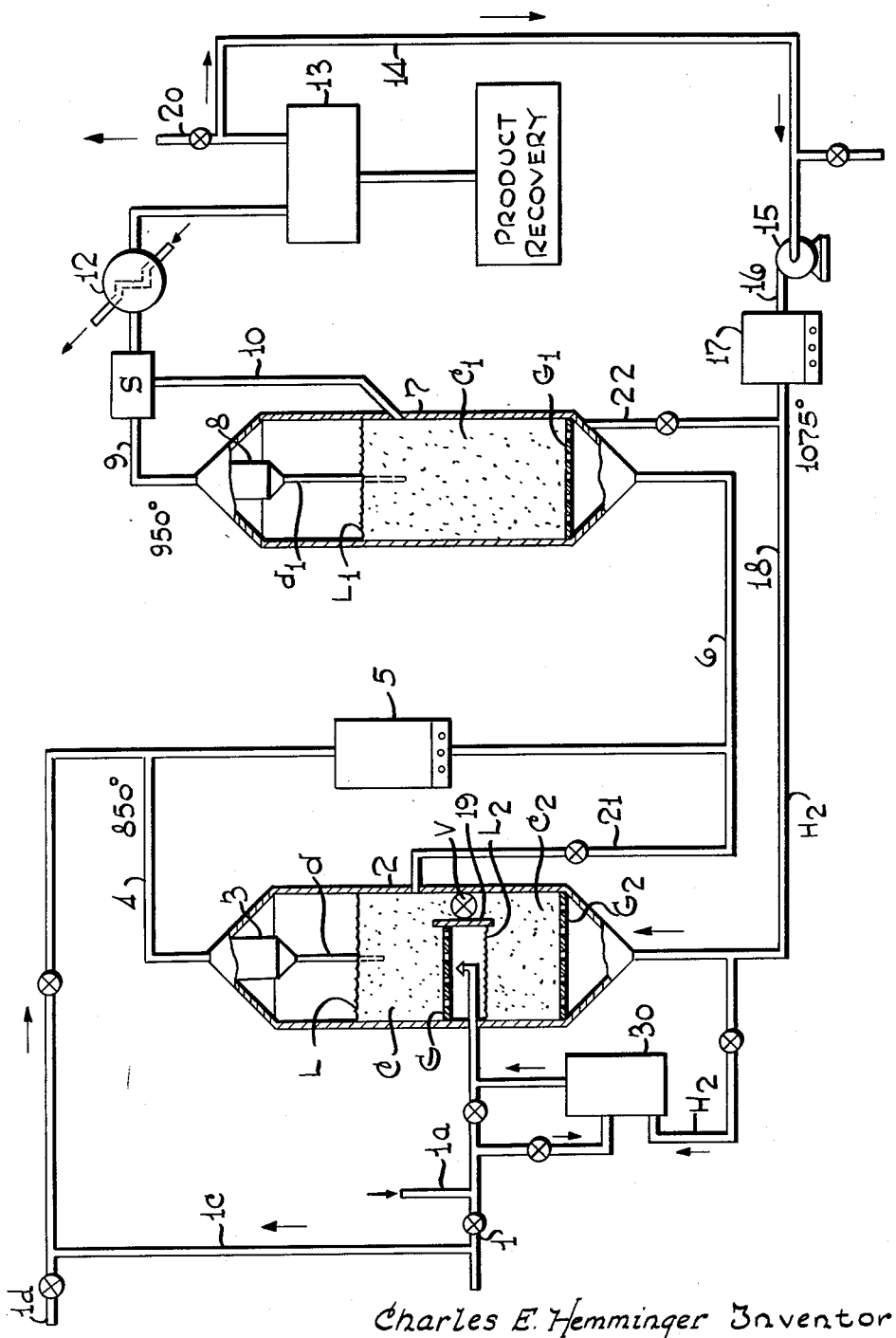
Charles E. Hemminger Inventor
By J. Cashman Attorney

United States Patent Office 2,737,473
Patented Mar. 6, 1956

2,737,473

HYDROFORMING

Charles E. Hemminger, Westfield, N. J., assignor to Esso Research and Engineering Company, a corporation of Delaware Application February 2, 1951, Serial No. 209,144

11 Claims. (Cl. 196—49)

The novel features of the present invention are fully disclosed in the following specification and claims forming a part thereof, read in connection with the accompanying drawing.

Heretofore and prior to the present invention, it was a matter of record and commercial practice in hydroforming, to carry out the reaction in a plurality of reactors each containing a fixed bed of hydroforming catalyst. And in the same connection, it has been known and practiced for several years that due to the highly endothermic nature of the hydroforming reaction that it is desirable and necessary to reheat the product issuing from each stage of a multi-stage hydroforming operation before it enters the next reactor in the series.

The present invention involves an improvement over prior practice in that the catalyst used in hydroforming is in the form of a dense fluidized bed in a plurality of reactors operating in series, in each of which, substantially isothermal conditions are maintained due to the nature of the fluidized bed, wherein thorough and intimate mixing of all portions of said bed is achieved.

In the prior hydroforming practice a very severe temperature drop through each reactor occurred. This was especially true, in the lead reactor. Thus, where the feed was fed at a temperature of, say, 1050° F. to the first of a series of fixed bed reactors, the temperature drop through this reactor amounted to about 150° F. It can thus be seen that this was a very unsatisfactory condition because the feed to the front end of the lead reactor was generally heated to a higher temperature than desired, and the reactants at the exit end of the reactor were at too low a temperature to effect efficient results. This situation could not be corrected by further preheating the feed because of the danger of thermal cracking the same to form degradation products of inferior quality.

The present invention involves the use of two or more reactors in series, but otherwise the nature and purpose of the process is entirely different from anything previously practiced commercially or disclosed in the literature, as far as is known. For example, according to the present improvements, naphthenes may be dehydrogenated to form the corresponding aromatics in the first reactor which as stated contains a fluidized bed of hydroforming catalyst, and thereafter the paraffinic hydrocarbons present in the effluent from the first reactor are subjected to aromatization in a second zone under more severe conditions, particularly, at higher temperature conditions whereby they are first cyclisized and thereafter dehydrogenated to form additional quantities of aromatics. In the second zone, the catalyst is also in the form of a fluidized bed, and because of this, substantially isothermal conditions are attained therein.

Another feature of the present invention involves the isomerization of non-benzenoid cyclic hydrocarbons, as for example, where ethyl cyclo-pentane is isomerized in the lead reactor to form a six-member ring naphthene and partially dehydrogenated therein, and after withdrawal from the lead reactor and reheating in a furnace, is substantially completely converted to an aromatic hydrocarbon in the second or subsequent reactors.

Another feature of this invention involves, by the choice of proper feed stocks, the manufacture of benzene, toluene and the like.

Another important feature of the invention involves treatment of a mixed feed containing virgin and catalytically cracked naphtha, or, in other words, treatment of a feed to the lead reactor containing virgin naphthenic hydrocarbons, plus at least some olefinic hydrocarbons contained in the catalytically cracked naphtha.

The main object of the present invention, therefore, is to carry out hydroforming and related processes in a continuous manner in a plurality of reactors each containing a fluidized bed of hydroforming catalyst with reheating between stages, principally characterized in that the recycle hydrogen gas does not exceed 4000–5000 cu. ft. of hydrogen measured at standard conditions of temperature and pressure, per barrel of oil feed.

Another feature of the present invention is to regenerate the catalyst with hydrogen in the lower portion of the lead reactor where it is in an environment rich in hydrogen and relatively poor in hydrocarbons.

Another feature of the present invention is to prehydrogenate the feed to the lead reactor to reduce the tendency of the operation to form excessive carbon, especially where olefins are present.

Another object of the present invention has to do with carrying out hydroforming operation in a process which is more flexible, efficient and economical than those heretofore commercially utilized or disclosed in prior literature.

A simplified flow plan depicts the essential apparatus utilized in carrying out the present invention into effect.

Referring in detail to the drawing a naphthenic feed preheated in a suitable heating means (not shown) enters the present system through line 1 at a temperature of the order of, say, 950° F. and is discharged into an upper section of a reactor 2 containing a fluidized bed of hydroforming catalyst C. This catalyst is in the form of a powder having a particle size of from 200–400 mesh and consists preferably of platinum carried on active alumina also containing hydrogen fluoride, the amount of platinum being from about 0.2–1 weight per cent of the total catalyst, the hydrogen fluoride being about 0–1.0 weight per cent of the total catalyst and the remainder being the active alumina. Palladium may be used in place of the platinum, and the carrier may be a mixture of alumina and silica. As shown in the drawing, the oil vapors enter the reactor below a grid G which serves as a gas distributing means. Any other gas distributing device known in the art may be employed. As usual, the vapors are fed through the reactor at a superficial linear velocity[1] of from 0.2–1 ft. per second so as to maintain the powdered catalyst in the fluidized state mentioned. The fluidized bed of catalyst has an upper dense phase level at L, above which there is disposed a light phase in which the concentration of the catalyst decreases upward. Under conditions of operation more fully set forth hereinafter, the vapors undergo conversion and issue from the dense fluidized bed toward the outlet of the reactor. Just prior to discharge from the reactor, the vapors are caused to flow through one or more solids-gas separators 3 in which entrained catalyst is separated from the vapors and returned to the dense phase by one or more dip pipes d. The effluent vapors from the reactor are passed via line 4 to a reheat furnace 5 where they are heated to a temperature approximately

---

[1] Superficial linear velocity is the gas or vapor velocity were there no catalyst in the reactor.

100°–200° F. higher than the vapors entering the lead reactor, and thereafter these vapors are introduced into the bottom of a second reactor 7 through line 6. As usual, the reactor 7 is provided with a suitable gas distributing means $G_1$ through which the vapors are forced and thence passed into a second body of the same catalyst $C_1$ as that utilized in the first reactor 2. The superficial linear velocity of the gases passing through the reactor 7 is of the same order as that disclosed in connection with the description of the operation in reactor 2. During the passage of the oil vapors through the bed of catalyst $C_1$, which has an upper dense phase level at $L_1$, the vapors undergo conversion under conditions set forth hereinafter and then pass upwardly from the dense phase toward the exit from reactor 7. As before, a light catalyst dispersion in vapors is disposed above the said dense phase fluid bed. As before, the vapors about to issue from the reactor 7 are forced through one or more gas-solids separators 8 wherein entrained catalyst is separated from the said vapors and returned to the dense phase through one or more dip pipes $d_1$. The converted oil vapors are withdrawn from reactor 7 through line 9, thence passed through a catalyst separator S wherein the vapors are treated with a normally liquid oil to separate catalyst still remaining in said vapors, and the catalyst oil slurry thus formed is returned to reactor 7 via line 10. The vapors now substantially freed of entrained catalyst pass from separator S via line 11, through a cooler 12 and thereafter into a gas and liquid separator 13. From separator 13 hydrogen-containing gas having a concentration of 85% or higher is withdrawn through line 14, thence forced through a compressor 15, thereafter fed via line 16 into a reheat furnace 17 and eventually fed via line 18 into the bottom of reactor 2.

A portion of the gas in line 14 is continuously rejected through line 20 to prevent excessive buildup of this gas in the system, and also to permit escape from the system of sulfur compounds that may be present in the original oil feed.

Referring again to reactor 2, it will be noted that therein is disposed a body of catalyst $C_2$, positioned in the lower part of the reactor. This catalyst also is in the form of a fluidized bed, supported on the usual grid $G_2$ and has an upper dense phase level at $L_2$. This catalyst is derived from the bed of catalyst C through a pipe 19 carrying a valve V for flow control. This bed of catalyst $C_2$ is contaminated with carbonaceous and other deposits, and is regenerated by treatment with hydrogen at temperatures higher than those prevailing in bed C or $C_1$. The regenerated catalyst from bed $C_2$ passes by elutriation to catalyst bed C carrying with it sensible heat, thus supplying at least a portion of the heat required in the bed of catalyst C.

Referring to bed of catalyst C, a portion of this catalyst is withdrawn via aerated standpipe 21, thence discharged into the vapors in line 6 and carried therewith into reactor 7. A corresponding amount of catalyst is withdrawn from catalyst bed $C_1$ via second aerated standpipe 22, discharged into vapor line 18 and returned to the catalyst bed $C_2$ where it is subjected to regeneration in the presence of hydrogen under conditions set forth more fully hereinafter.

A modification of the present invention involves charging to the lead reactor a mixture of virgin naphthenic feed, plus some cracked naphtha obtained from a catalytic cracking or thermal operation. This latter portion of the feed is introduced into the present system via line $1a$ and thereafter via line 1 into reactor 2 with the virgin naphtha. Olefins in the cracked naphtha are hydrogenated in reactor 2.

Another modification of the present invention involves feeding the virgin naphtha, or a part thereof, via line $1C$ controlled by a suitable valve directly into furnace 5, thus bypassing reactor 2, or unconverted and recycled material may likewise be returned from the product recovery equipment to the process via line $1d$, controlled by a suitable valve, directly into furnace 5, also bypassing the first reactor 2. In these last two instances, however, the cracked naphtha or a specialized cut of naphtha would pass through both reactors in series.

A good way to avoid excessive carbon deposition on the catalyst is to prehydrogenate the feed if it is highly unsaturated in line 1 or lines 1 and $1a$ by passing the same through a hydrogenation zone 30 where in the presence of a known hydrogenation and a fixed bed of a catalyst such as nickel or a mixture of say tungsten and nickel sulfide, and added hydrogen, say about 500 cubic feet per barrel of oil, the feed undergoes simple (not destructive) hydrogenation. A temperature of 500°–800° F. and system pressure may be used in this prehydrogenation.

As previously indicated, the drawing and description thereof have not included in the interest of clarity, conventional accessory apparatus that would normally be employed in a plant of the character described. For example, the petroleum engineer will readily understand that in a commercial plant various flow meters, additional pumps, compressors, temperature control and recording devices, etc., would ordinarily be included as necessary and desirable accessory equipment. The final purification and recovery of the desired product would, of course, be carried out in conventional apparatus not shown in the drawing or described in words herein.

In order to illustrate the invention more fully, the following specific examples are set forth with the understanding that the specific details are merely illustrative of the invention and the said invention is not limited to the precise details therein set forth.

EXAMPLE I

In this example, a virgin naphtha having a boiling range of from 200 to 350° F. is fed at a temperature of about 950° F. to the reactor 2 via line 1 where it is contacted with the previously disclosed platinum* catalyst. The conditions of operation are set forth below.

| | |
|---|---:|
| Temperature in reactor 2, °F. | 850 |
| Temperature in reactor 7, °F. | 925 |
| Pressure in reactor 2, p. s. i. g. | 175 |
| Pressure in reactor 7, p. s. i. g. | 150 |
| Space velocity of feed in reactor 2, lbs. oil/hr./lb. catalyst in reactor | 4 |
| Space velocity of feed in reactor 7, lbs. oil/hr./lb. catalyst in reactor | 2 |
| Recycle gas (line 18), in reactor 2, cu. ft./bbl. fresh feed [1] | 3000 |
| Recycle gas (line 22), in reactor 7, cu. ft./bbl. fresh feed [1] | 3000 |
| Catalyst/to oil ratio in reactor 2, lbs. catalyst from $C_2$ to C/lb. feed | 2 |
| Catalyst/to oil ratio in reactor 7, lbs. catalyst from C to $C_1$/lb. feed | 1 |

[1] Gas measured under standard conditions.

*Inspection*

| | Feed | Product |
|---|---|---|
| Gravity, A. P. I. | 55 | 53 |
| Reid Vapor Pressure | 0.2 | 5.0 |
| Initial Boiling Point | 200 | 150 |
| Final Boiling Point | 350 | 360 |
| Naphthenes, Wt. Percent | 45 | 3 |
| Aromatics, Wt. Percent | 10 | 65 |
| Paraffin, Wt. Percent | 45 | 32 |
| Yield, Vol. Percent | 100 | 88 |
| Octane, Research, Clear | 50 | 93 |

EXAMPLE II

In this example a mixture of cracked naphtha and virgin naphtha in the proportions of 25 vol. per cent of cracked naphtha with 75% virgin naphtha were fed to

*Pt. 0.5, HF 1.0, $Al_2O_3$ 98.5 wt. per cent.

reactor 2 under the following conditions of operation (catalyst in wt. per cent—Pt. 0.5, HF 1.0, $Al_2O_3$ 98.5):

| | |
|---|---|
| Temperature in reactor 2, °F. | 825 |
| Temperature in reactor 7, °F. | 950 |
| Pressure in reactor 2, p. s. i. g. | 175 |
| Pressure in reactor 7, p. s. i. g. | 150 |
| Space velocity of feed in reactor 2, lbs. oil/hr./lb. catalyst in reactor | 4 |
| Space velocity of feed in reactor 7, lbs. oil/hr./lb. catalyst in reactor | 2 |
| Recycle gas (line 18), in reactor 2, cu. ft./bbl. fresh feed [1] | 2500 |
| Recycle gas (line 22), in reactor 7, cu. ft./bbl. fresh feed [1] | 2500 |
| Catalyst/to oil ratio in reactor 2, lbs. catalyst from $C_2$ to C/lb. feed | 3 |
| Catalyst/to oil ratio in reactor 7, lbs. catalyst from C to $C_1$/lb. feed | 1.3 |

[1] Gas measured at standard conditions of temperature and pressure.

*Inspection*

| | Feed | Product |
|---|---|---|
| Gravity, A. P. I. | 53 | 52 |
| Reid Vapor Pressure | 0.3 | 4.0 |
| Initial Boiling Point | 200 | 160 |
| Final Boiling Point | 400 | 410 |
| Naphthenes, Wt. Percent | 40 | 4 |
| Aromatics, Wt. Percent | 27 | 69 |
| Paraffin, Wt. Percent | 33 | 27 |
| Yield, Vol. Percent | 100 | 90 |
| Octane, Research, Clear | 57 | 96 |

EXAMPLE III

In this example virgin naphtha boiling within the range of from 156 to 198° F. was fed to the system in order to produce benzene under the following conditions of operation (catalyst same as in Example I):

| | |
|---|---|
| Temperature in reactor 2, °F. | 800 |
| Temperature in reactor 7, °F. | 900 |
| Pressure in reactor 2, p. s. i. g. | 150 |
| Pressure in reactor 7, p. s. i. g. | 135 |
| Space velocity of feed in reactor 2, lbs. oil/hr./lb. catalyst in reactor | 2 |
| Space velocity of feed in reactor 7, lbs. oil/hr./lb. catalyst in reactor | 1 |
| Recycle gas (line 18), in reactor 2, cu. ft./bbl. fresh feed [1] | 2000 |
| Recycle gas (line 22), in reactor 7, cu. ft./bbl. fresh feed [1] | 2000 |
| Catalyst/to oil ratio in reactor 2, lbs. catalyst from $C_2$ to C/lb. feed | 1.0 |
| Catalyst/to oil ratio in reactor 7, lbs. catalyst from C to $C_1$/lb. feed | 1.3 |

[1] Gas measured at standard conditions of temperature and pressure.

*Inspection*

| | Feed | Product |
|---|---|---|
| Initial Boiling Point | 156 | |
| Final Boiling Point | 198 | |
| Naphthenes, Wt. Percent | 26.0 | 2.0 |
| Aromatics, Wt. Percent | 2.0 | [1] 25.0 |
| Paraffin, Wt. Percent | 72.0 | 73.0 |
| Yield, Vol. Percent | 100.0 | |
| Temperature in 2C, °F | 825 | 950 |
| Temperature in $C_1$, °F | 900 | 975 |
| Cubic feet $H_2$ | 1,500 | 4,000 |
| Pressure, lbs | 100 | 400 |

[1](Benzene.)

In the regeneration of the catalyst conducted as indicated in bed $C_2$ located in the lower part of reactor 2, the fouled catalyst is treated with a hydrogen-containing gas at a temperature of from about 975° to 1150° F. and, of course, under the pressure existing in reactor 2. With respect to the residence time of the catalyst in bed $C_2$, it is preferable to maintain the catalyst in this bed for about ¼ to 1 hour, and the catalyst is caused to remain in bed C for approximately an equivalent period of time. The flow of catalyst from bed C to bed $C_2$ is controlled by manipulating valve V in pipe 19. Now with respect to the temperature in bed $C_2$ this may be controlled by the firing in furnace 17 of the recycle gas in lines 16 and 18. If the temperature becomes too high in bed $C_2$, a portion of the gas in line 16 may be by-passed around furnace 17.

To recapitulate briefly therefore the present invention constitutes the departure from prior practice in that less hydrogen than formerly required per barrel of oil is required for continuous operation in the hydroforming process. Also, an important feature of the present invention is that a lower pressure may be employed. In other words, a pressure of from say 100–400 lbs. per square inch may be utilized in the hydroforming system as hereinbefore described, which, of course, is less than the 750 lbs. per square inch conventionally employed in this type of operation. Then, of course, as hereinbefore described the present invention utilizes the fluid catalyst technique, and is further characterized in that provision is made for treating the catalyst which has become fouled with a hydrogen-containing gas to regenerate or reactivate the same.

It is to be understood that instead of using a platinum group metal other hydroforming catalysts may be used, for example, supported oxides of the fourth and sixth group of the periodic system.

A good hydroforming catalyst is one containing say 10 wt. percent $MoO_3$ on 90 wt. percent $Al_2O_3$. Furthermore, and in particular in the case of platinum where hydrogen fluoride is employed as part of the catalyst composition, it is desirable to add hydrogen fluoride continuously to maintain the said hydrogen fluoride on the catalyst for during the reaction there is some tendency for the catalyst to be driven off by volatilization.

Numerous modifications of the invention may be made by those who are familiar with this art without departing from the spirit thereof.

What is claimed is:

1. A continuous method for hydroforming naphthas in a multi-stage operation carried out at a pressure of from about 100–400 p. s. i. and in which a fluidized bed of a hydroforming catalyst comprising a platinum group metal carried on a carrier comprising active alumina and also containing halogen-containing material is present in each stage which comprises feeding a preheated naphtha to the first stage of the operation, simultaneously feeding to the first stage of the operation a hydrogen-containing gas, the amount of the latter being less than 5000 cu. ft. of hydrogen per barrel of oil, maintaining a relatively low hydroforming temperature, permitting the naphtha to contact the fluidized bed of catalyst in the first stage under hydroforming conditions, withdrawing catalyst from the said first stage after it has been resident therein for an average period of time of from about ¼–1 hour and conducting it to a regeneration zone disposed beneath the bed of catalyst employed in the said first stage and treating the catalyst with a hydrogen-containing gas for an average period of time of from about ¼–1 hour to remove contaminating deposits formed by the hydroforming reaction in said first stage and returning the regenerated catalyst to said first stage, withdrawing the products from the first stage, reheating the same to a temperature at least about 75° F. higher than that prevailing in the first stage, conducting the reheated products to a second hydroforming stage where they are contacted with a fluidized bed of hydroforming catalyst, permitting the first stage products and the fluidized bed of catalyst to remain in contact with each other for a sufficient period of time to complete the desired reaction, and thereafter recovering a hydroformed product.

2. A continuous process for hydroforming naphthas in a multi-stage operation in which a fluidized bed of hydroforming catalyst is present in each stage which comprises feeding preheated naphtha to the first stage of the process, simultaneously feeding in the first stage of the operation a hydrogen-containing gas, the amount of the latter being from about 4000 to 5000 cu. ft. of hydrogen per barrel of oil, maintaining a relatively low hydroforming temperature and pressure of from 100–400 p. s. i. in said reaction zone, permitting the naphtha to contact the fluidized bed of catalyst in the first stage for a sufficient period of time to effect the desired conversion, withdrawing catalyst from the said first stage after it has been resident therein for an average period of time of from about ¼–1 hour and conducting it to a regeneration zone disposed beneath the bed of catalyst employed in the said first stage and treating the catalyst with a hydrogen-containing gas for an average period of time of from about ¼–1 hour to remove contaminating deposits formed by the hydroforming reaction in said first stage and returning the regenerated catalyst to said first stage, withdrawing the product from the first stage, reheating the said product to a temperature at least about 75° F. higher than that prevailing in the first stage, conducting the said reheated product to a second hydroforming stage where it is contacted with a fluidized bed of hydroforming catalyst, maintaining a pressure of from about 100–400 p. s. i. in said second stage, permitting the said product and the fluidized bed of catalyst to remain in contact with each other for a sufficient period of time to complete the desired reaction and thereafter recovering a hydroformed product.

3. The method set forth in claim 2 in which catalyst is withdrawn from the first stage of the reaction and delivered to the second stage of the system and simultaneously a corresponding amount of catalyst is withdrawn from the second stage of the reaction, conducted to a regeneration zone disposed beneath the bed of catalyst employed in the said first stage and treating the fouled catalyst in the regeneration zone with a hydrogen-containing gas for a sufficient period of time substantially to remove contaminating deposits therefrom.

4. The method set forth in claim 1 in which the feed to the first stage of the process is a mixture of virgin naphtha and cracked naphtha.

5. The method set forth in claim 2 in which the feed to the first stage of the process is a mixture of virgin naphtha and cracked naphtha.

6. The method set forth in claim 1 in which the feed to the first stage is treated with hydrogen under conditions suitable for removing at least a portion of the unsaturates therein contained, prior to the introduction of said feed into the said first stage.

7. The method set forth in claim 2 in which the feed to the first stage is treated with hydrogen under conditions suitable for removing at least a portion of the unsaturates therein contained, prior to the introduction of said feed into the said first stage.

8. The method set forth in claim 1 in which the temperature in the first stage is of the order of about 850° F. and in the second stage the temperature is of the order of about 900°–950° F.

9. The method set forth in claim 2 in which the temperature in the first stage is of the order of about 850° F. and in the second stage the temperature is of the order of about 900°–950° F.

10. The method set forth in claim 1 in which hydrogen fluoride is continuously added with the feed to both stages of the process.

11. The method set forth in claim 2 in which hydrogen fluoride is continuously added with the feed to both stages of the process.

References Cited in the file of this patent

UNITED STATES PATENTS

| | | |
|---|---|---|
| 2,436,486 | Scheineman | Feb. 24, 1948 |
| 2,478,916 | Haensel et al. | Aug. 16, 1949 |
| 2,664,386 | Haensel | Dec. 29, 1953 |
| 2,667,461 | Guyer et al. | Jan. 26, 1954 |

OTHER REFERENCES

Bland: "Petroleum Processing," vol. 5, pages 351–60 (1950).